G. W. TURNEY.
RADIATOR TUBE AND METHOD OF PRODUCING SAME.
APPLICATION FILED DEC. 18, 1919.
1,395,618.
Patented Nov. 1, 1921.
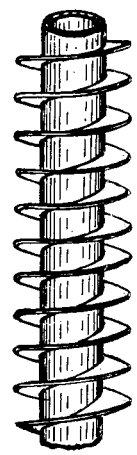
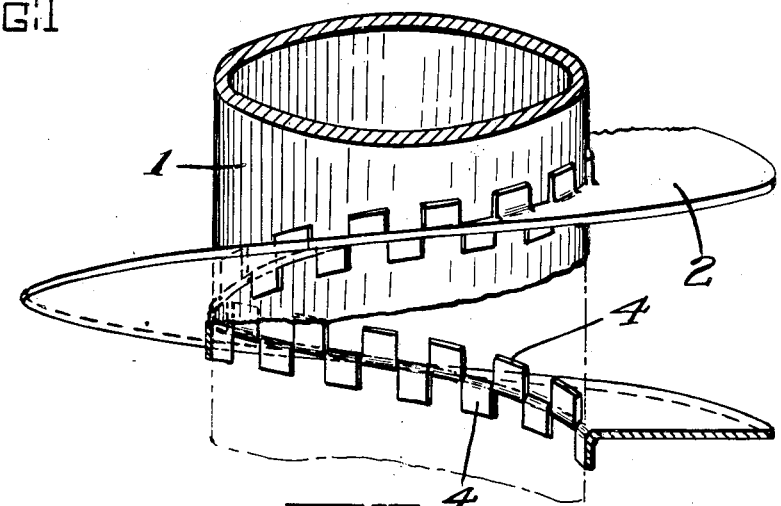
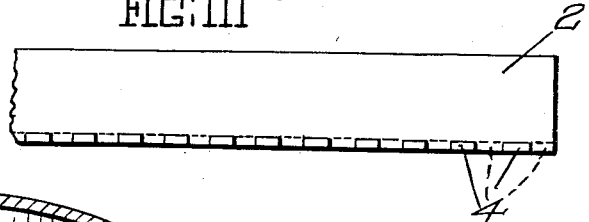
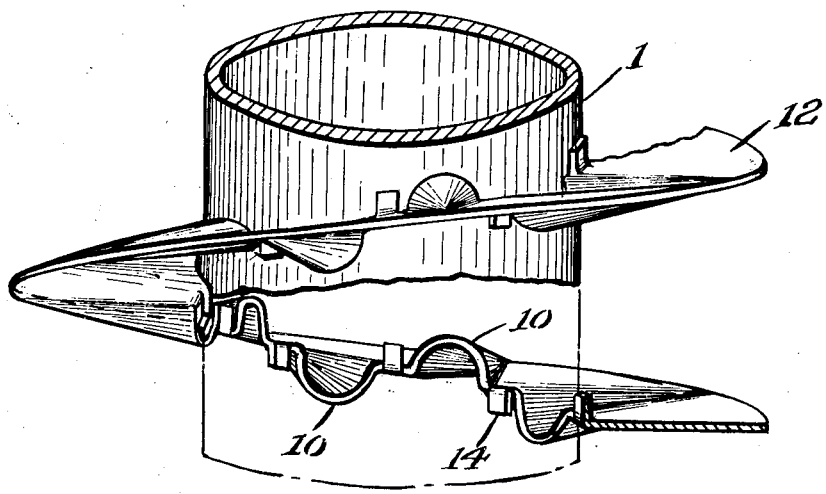
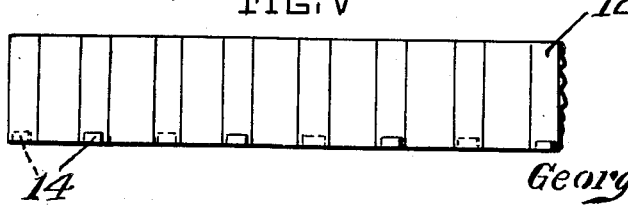
Inventor
George W. Turney
By Ellis Spear Jr.
Attorney

UNITED STATES PATENT OFFICE.

GEORGE WEBBER TURNEY, OF ROME, NEW YORK.

RADIATOR-TUBE AND METHOD OF PRODUCING SAME.

1,395,618.   Specification of Letters Patent.   Patented Nov. 1, 1921.

Application filed December 18, 1919. Serial No. 345,739.

*To all whom it may concern:*

Be it known that I, GEORGE W. TURNEY, a citizen of the United States, residing at Rome, county of Oneida, State of New York, have invented certain new and useful Improvements in Radiator-Tubes and Methods of Producing the Same, of which the following is a specification.

This invention relates to radiators and the method of producing the same and particularly to radiator tubes having fins or flanges for increasing their surface of radiation.

While my invention is of somewhat varied applicability, I have selected as illustrative and explanatory thereof certain embodiments of special importance in radiators for air planes and motor vehicles.

In the manufacture of such radiator tubing it has been the practice to slip over a tube annular disks or spiral helix, soldering the inner edge of the same to the exterior surface of the tube. While this has been successfully practised, there has been great difficulty in making substantial solder joints without spreading an excess of solder over the tube in such a way as to decrease its radiation.

It is the object of my present invention to provide fins of otherwise standard structure with a suitable footing by which the soldering of the flange may be made more easy, with less excess solder and with greater security. Throughout the specification and drawings like reference characters are employed to indicate corresponding parts, and in the drawings:

Figure I is a view of a length of radiator tubing of the general type involved.

Fig. II an enlarged fragmentary and partially sectioned detail showing one form of my invention, Fig. III is a plan view of the strip.

Fig. IV is a view similar to Fig. II showing a modified form of footing, and

Fig. V is a view similar to Fig. III of the strip shown in Fig. IV.

In the form selected for illustration the radiator tubing 1 is surrounded by a spiral helix 2 formed from a flat strip and wound about the tube 1 to which it is soldered along the line of its inner edge. Referring to Fig. II the flange or fin 2 is slitted along its inner edge and tabs 4 bent up alternately and laterally at substantially right angles to the adjacent plane of the fin itself. These tabs 4 constitute a staggered footing which not only assists in supporting the fin 2 in proper position, but which afford effective surfaces for soldering the fin 2 on the exterior surface of the tubing 1. In Fig. IV I have shown a modified form in which the tube 1 has wound on it a flange 12 on the inner edge of which are formed footings 14 spaced apart somewhat and bent in opposite directions as in the instance first described. In this form the fin 12 is crimped as indicated at 10. These crimps are formed radially and are usually of somewhat half conic section. The crimps are arranged in alternate reverse so that the hollow of one crimp faces up while the next adjacent faces down. The conic axis of the crimp lying substantially radially of the tube 1 permits the strip to be wound readily without excessive drawing.

The crimps shown in Fig. IV are slightly exaggerated for obvious reasons. In this form also, as in that shown in Fig. II, the lateral bearings of the fins are greatly increased and the soldering surface greatly multiplied. The solder is more easily applied and localized, and the intervening surface of the tube 1 more readily kept free from films and lumps of solder than in previous structures.

Various modifications may obviously be made in the nature of the fins or flanges, in their disposition on the tube, in their manner of attachment to the tube and otherwise in matters of form and details of structure, all such modifications are within the purview of my invention if within the limits of the appended claims.

What I therefore claim and desire to secure by Letters Patent is:

1. A radiator member comprising a conductor tube and a spirally disposed fin thereon, said spiral fin having on its inner edge a series of alternately oppositely bent tabs forming a staggered soldering footing disposed alternately above and below the plane of the fin in contact with the surface of said tube for intimate connection therewith.

2. A radiator member comprising a conductor tube and an annular spirally disposed fin thereon, said fin having on its inner edge a series of alternately oppositely bent tabs forming a staggered soldering footing disposed alternately above and below the plane of the fin in contact with the surface of said tube for intimate connection therewith.

3. A radiator member comprising a conductor tube and an annular fin thereon, said fin having on its inner edge a series of tabs forming a staggered soldering footing disposed alternately above and below the plane of the fin in contact with the surface of said tube for intimate connection therewith.

4. A radiator tube of the class described, comprising a conductor member and an annular fin member, said fin member having portions of its inner edge staggered to form a footing alternately disposed above and below the plane of the fin and attached to said conductor member.

5. A radiator tube of the class described, comprising a tubular conductor member and an annular fin member, said fin member having portions of its inner edge formed with a series of radial cuts, the edge portions between cuts being bent to form a footing disposed on opposite sides of the plane of the fin and soldered to said tube.

6. A radiator tube of the class described, comprising a tubular conductor member and an annular fin member, said fin member having portions of its inner edge formed with a series of oppositely faced radial crimps and tabs formed on said edge between said crimps and bent to form a soldering footing on said tube disposed on opposite sides of the plane of the fin.

7. A radiator fin comprising a flat helix having lateral turned soldering tabs on its inner edge disposed on opposite sides of the plane of the helix.

8. The method of forming a fin radiator tube consisting in forming a flat helix having lateral turned tabs disposed on opposite sides of the plane of the helix, and in assembling said helix on the tube and in soldering said tabs to the surface of said tube.

9. The method of forming a fin radiator tube consisting in forming a flat helix having radial cuts, in laterally bending the edge between said cuts to dispose the bent portions on opposite sides of the helix, in assembling said helix on the tube and in soldering said tabs to the surface of said tube.

10. A fin for a radiator tube consisting of a flat helix having its inner edge slitted at spaced intervals and having the material included between said slits bent alternately in opposite direction to provide a series of soldering flanges disposed alternately above and below the plane of the helix in contact with the surface of the radiator tube.

In testimony whereof I affix my signature in presence of two witnesses.

GEORGE WEBBER TURNEY.

Witnesses:
E. P. WOLF,
GEORGE T. WILLIAMS.